United States Patent
Chang et al.

(10) Patent No.: US 12,308,731 B2
(45) Date of Patent: May 20, 2025

(54) CONTROLLER OF POWER CONVERSION CIRCUIT AND OPERATING METHOD THEREOF

(71) Applicant: uPI semiconductor corp., Zhubei (TW)

(72) Inventors: Chih-Lien Chang, Zhubei (TW); Wei-Hsiu Hung, Zhubei (TW); Yen-Chih Lin, Zhubei (TW); Chen-Xiu Lin, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 284 days.

(21) Appl. No.: 18/181,877

(22) Filed: Mar. 10, 2023

(65) Prior Publication Data
US 2023/0387797 A1    Nov. 30, 2023

(30) Foreign Application Priority Data
May 27, 2022 (CN) .......................... 202210591273.2

(51) Int. Cl.
*H02M 1/00* (2007.01)
*H02M 3/157* (2006.01)

(52) U.S. Cl.
CPC ....... *H02M 1/0009* (2021.05); *H02M 1/0025* (2021.05); *H02M 3/157* (2013.01)

(58) Field of Classification Search
CPC .... H02M 1/0009; H02M 3/158; H02M 3/156; H02M 1/0025; H02M 1/0003
See application file for complete search history.

(56) References Cited

U.S. PATENT DOCUMENTS

| | | | |
|---|---|---|---|
| 5,719,519 A | * | 2/1998 | Berringer ........... H03K 17/0828 327/488 |
| 6,930,474 B2 | | 8/2005 | Wang |
| 9,244,473 B2 | | 1/2016 | Young et al. |
| 9,853,548 B1 | | 12/2017 | Zhang |
| 10,116,212 B2 | | 10/2018 | Luo et al. |
| 2016/0036326 A1 | | 2/2016 | Sreenivas |
| 2021/0328509 A1 | * | 10/2021 | Tseng ................... H02M 1/0009 |
| 2022/0115955 A1 | * | 4/2022 | Yan ...................... H02M 3/1588 |

* cited by examiner

*Primary Examiner* — Alex Torres-Rivera
(74) *Attorney, Agent, or Firm* — McClure, Qualey & Rodack, LLP

(57) ABSTRACT

A controller of a power conversion circuit, coupled to a smart power stage (SPS), controls SPS to convert an input voltage into an output voltage and provides an output current. The SPS provides a current monitoring signal to the controller. The controller includes a control loop, a sampling circuit and a current reconstruction circuit. The control loop is coupled to SPS and generates a pulse-width modulation (PWM) signal to control the operation of SPS. The sampling circuit is coupled to SPS and receives the current monitoring signal. The current monitoring signal is sampled according to PWM signal to obtain a calibration reference value. The current reconstruction circuit is coupled to the control loop and sampling circuit and generates a reconstructed current corresponding to actual output current. The reconstructed current is produced according to an input voltage, a reference voltage and PWM signal and calibrated using the calibration reference value.

14 Claims, 7 Drawing Sheets

CONTROLLER OF POWER CONVERSION CIRCUIT AND OPERATING METHOD THEREOF

BACKGROUND OF THE INVENTION

1. Field of the Invention

The invention relates to a power conversion circuit; in particular, to a controller of a power conversion circuit and an operating method thereof.

2. Description of the Prior Art

In general, a smart power stage (SPS) applied to a power conversion circuit not only combines a driver and high-side/low-side transistors in the same package to reduce the size, but also contains the circuit to report a current monitoring signal related to an output current.

However, there are many deficiencies in the SPS currently available, and it requires significant improvement. For example:

(1) when the high-side transistor is turned on, the current monitoring signal (IMON) reported by the SPS is very different from the actual inductor current. The peak current clamping function fails to work properly with such signal, and the output current may exceed the upper limit that the SPS can withstand and cause damages to components or system;

(2) the output current changes rapidly due to the fast switching frequency, and the SPS needs to first generate the current monitoring signal and then transmit it to the controller. It is easily affected by parasitic components on the signal transmission path, resulting in delayed reporting; and (3) the accuracy of the current monitoring signals reported by various SPSs on the market is different. The controller needs to be specifically designed for a certain model of SPS, resulting in poor compatibility with different SPSs, and the error tolerance is also insufficient.

SUMMARY OF THE INVENTION

Therefore, the invention provides a controller of a power conversion circuit and an operating method thereof to solve the above-mentioned problems of the prior arts.

An embodiment of the invention is a controller of a power conversion circuit. In an embodiment, the controller is coupled to a smart power stage (SPS), configured to control the SPS to convert an input voltage into an output voltage and provide an output current. The SPS provides a current monitoring signal to the controller. The controller includes a control loop, a sampling circuit and a current reconstruction circuit. The control loop is coupled to the SPS and configured to generate a pulse width modulation (PWM) signal according to the output voltage and a reference voltage to control the operation of the SPS. The sampling circuit is coupled to the SPS and configured to receive the current monitoring signal and sample the current monitoring signal according to the PWM signal to obtain a calibration reference value. The current reconstruction circuit is coupled to the control loop and the sampling circuit. The current reconstruction circuit generates a reconstructed current corresponding to the current monitoring signal according to an input voltage, a reference voltage and the PWM signal. The reconstructed current is calibrated by using the calibration reference value.

In an embodiment, the power conversion circuit has an output inductance; when the PWM signal is in a first state, the current reconstruction circuit generates a step-up value according to the following formula:

$$ISTU=[(VIN-VREF)/SET] \times TCLK,$$

wherein VIN is the input voltage, VREF is the reference voltage, SET is a setting value related to the output inductance, TCLK is a system clock, and ISTU is the step-up value.

In an embodiment, the power conversion circuit has an output inductance, and when the PWM signal is in a second state, the current reconstruction circuit generates a step-down value according to the following formula:

$$ISTD=(VREF/SET) \times TCLK,$$

wherein VREF is the reference voltage, SET is the setting value related to the output inductance, TCLK is the system clock, and ISTD is the step-down value.

In an embodiment, the current reconstruction circuit includes: a step value generator, coupled to the control loop, configured to generate a step value according to the input voltage, the reference voltage and the PWM signal; a calibrator, coupled to the control loop, configured to generate the calibration value according to the calibration reference value and the reconstructed current at the rising edge of the PWM signal when the pulse width modulation signal is rising; and the calculator, coupled to the step value generator and the calibrator respectively, configured to generate the reconstructed current according to the step value and the calibration value.

In an embodiment, the calibration value is generated according to the following formula:

$$IOFF=DIMON-IRE,$$

wherein DIMON is the calibration reference value, IOFF is the calibration value, and IRE is the reconstructed current.

In an embodiment, the reconstructed current is calibrated according to the following formula:

$$IRE'=IST+IOFF+IRE,$$

wherein IST is the step value, IOFF is the calibration value, IRE is the reconstructed current value of a first system clock, IRE' is the reconstructed current value of a second system clock, and the second system clock is immediately after the first system clock.

In an embodiment, the sampling circuit also includes a timer. When the cycle of the PWM signal obtained by the timer is less than a default time, the controller stops generating the calibration value.

Another preferred embodiment of the invention is a method of operating a controller of a power conversion circuit, which is used to control a SPS to convert an input voltage into an output voltage and provide an output current. In this embodiment, the SPS provides a current monitoring signal related to the output current to the controller. The method includes following steps of: (a) generating a PWM signal according to the output voltage and a reference voltage to control the operation of the SPS; (b) sampling the current monitoring signal according to the PWM signal to obtain a calibration reference value; and (c) generating a reconstructed current corresponding to the current monitoring signal according to the input voltage, the reference voltage and the PWM signal while calibrating the reconstructed current by using the calibration reference value.

In an embodiment, the power conversion circuit has an output inductance; the step (c) further includes: when the PWM signal is in a first state, generating a step-up value according to the following formula:

$$ISTU=[(VIN-VREF)/SET] \times TCLK,$$

wherein VIN is the input voltage, VREF is the reference voltage, SET is the setting value related to the output inductance, TCLK is the system clock and ISTU is the step-up value.

In an embodiment, the power conversion circuit has an output inductance; the step (c) further includes: when the PWM signal is in a second state, generating a step-down value according to the following formula:

$$ISTD=(VREF/SET) \times TCLK,$$

wherein VREF is the reference voltage, SET is the setting value related to the output inductance, TCLK is the system clock and ISTD is the step-down value.

In an embodiment, the step (c) further includes: generating a step value according to the input voltage, the reference voltage and the PWM signal; generating a calibration value according to the calibration reference value and the reconstructed current at a rising edge of the PWM signal when the pulse width modulation signal is rising; and generating a reconstructed current according to the step value and the calibration value.

In an embodiment, the calibration value is generated according to the following formula:

$$IOFF=DIMON-IRE,$$

wherein DIMON is the calibration reference value, IOFF is the calibration value, and IRE is the reconstructed current.

In an embodiment, the reconstructed current is generated according to the following formula:

$$IRE'=IST+IOFF+IRE,$$

wherein IST is the step value, IOFF is the calibration value, IRE is the reconstructed current value of a first system clock, IRE' is the reconstructed current value of a second system clock, and the second system clock is immediately after the first system clock.

In an embodiment, the method further includes: when a cycle of the PWM signal is less than a default time, stopping generating the calibration value.

Compared to the prior art, the controller of the power conversion circuit and its operating method of the invention can achieve the following effects and advantages:

(1) High compatibility: no matter what method the SPS uses to generate the current monitoring signal (IMON), the controller of the power conversion circuit of the invention is only triggered by the rising edge of the PWM signal to sample the valley value of the current monitoring signal (IMON). To calibrate the reconstructed current, and the rest of the current waveform is reconstructed inside the controller, so that the peak current clamping function can work normally; and (2) No signal delay problem: a digital reconstructed current corresponding to the current monitoring signal is generated inside the controller in the invention. It is provided as a digital value for the digital circuit inside the controller for direct calculation, so there will be no signal delay issue caused by the analog circuit.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
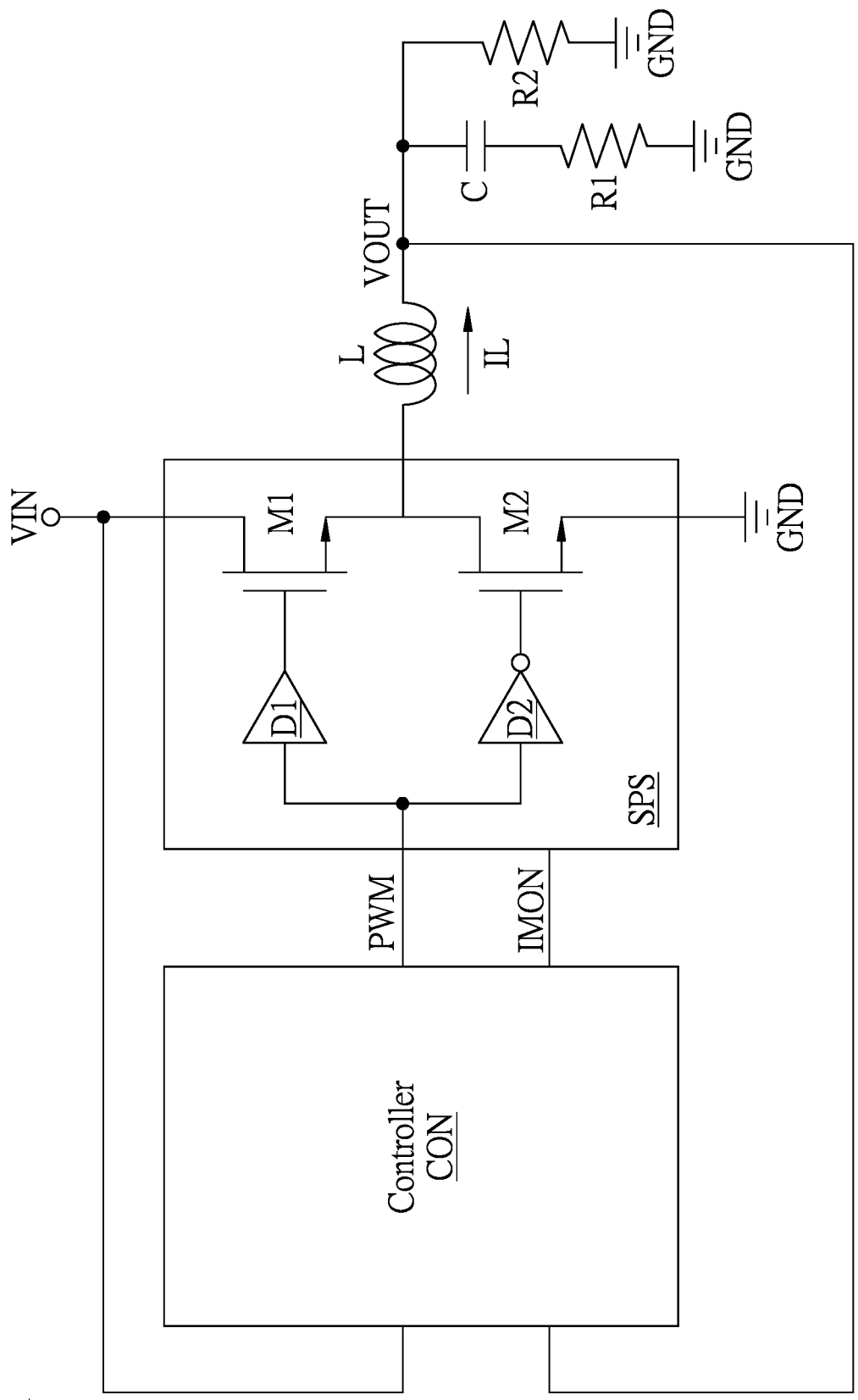
FIG. 1 illustrates a schematic diagram of a controller of a power conversion circuit coupled to a SPS according to an embodiment of the invention.

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

A specific embodiment according to the invention is a controller of a power conversion circuit. In this embodiment, the controller is coupled to a smart power stage, and the smart power stage provides a current monitoring signal to the controller. The power conversion circuit can be a single-phase or multi-phase Buck DC-DC converter, but not limited to this.

For example, as shown in FIG. 1, the controller CON of the power conversion circuit 1 is coupled to the smart power stage SPS and the controller CON controls the smart power stage SPS to convert an input voltage VIN into an output voltage VOUT. The smart power stage SPS is coupled to an output inductor L, and an output current IL flows through the output inductor L. The smart power stage SPS also provides a current monitoring signal IMON related to the output current IL to the controller CON. The smart power stage SPS includes a first driver D1, a second driver D2, a high-side transistor M1 and a low-side transistor M2 in the same integrated circuit package. The first driver D1 and the second driver D2 receive the pulse width modulation signal PWM from the controller CON respectively and control the operation of the high-side transistor M1 and the low-side transistor M2 according to the pulse width modulation signal PWM respectively.

Figure 2:
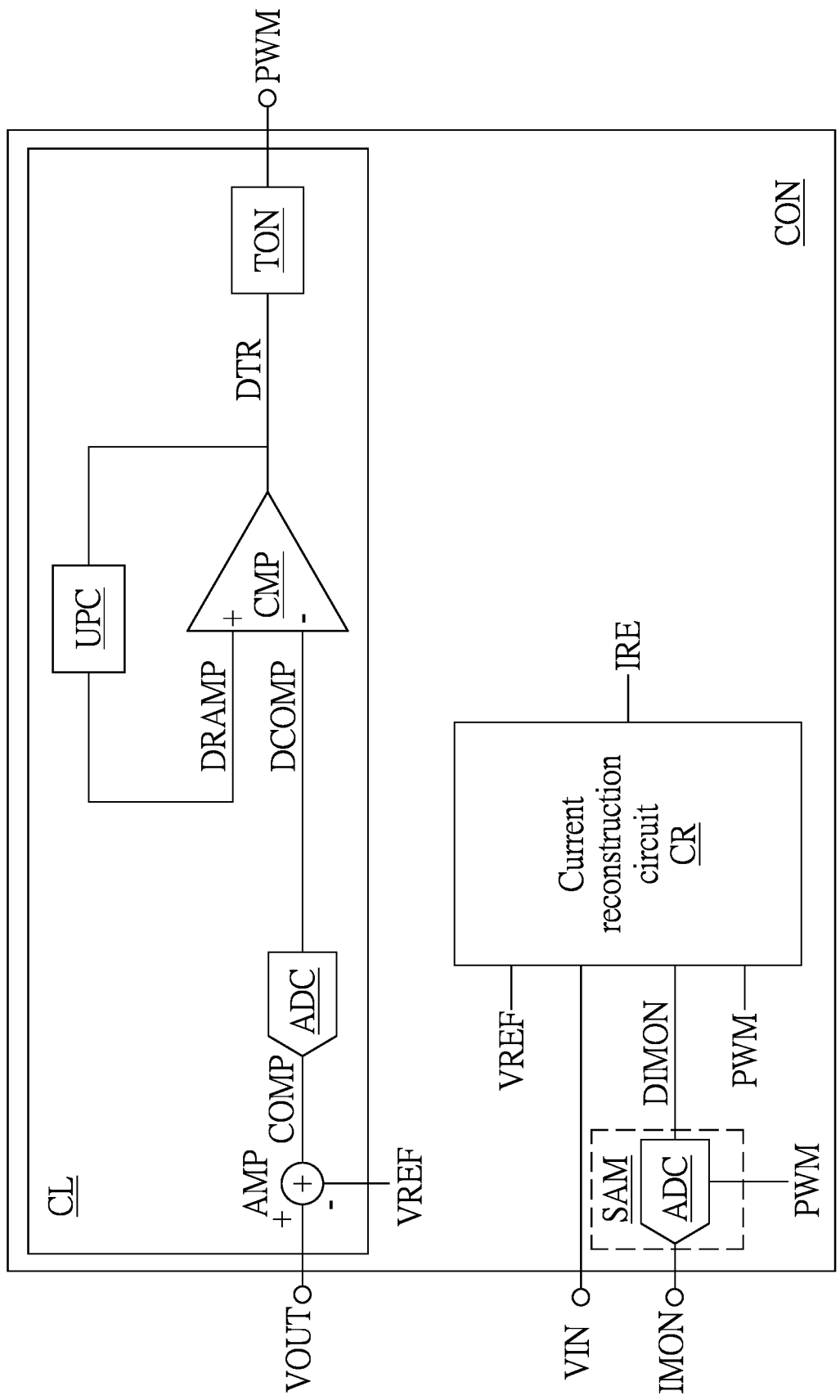
FIG. 2 illustrates a schematic diagram of an embodiment of a controller of a power conversion circuit of the invention.

Please refer to FIG. 2. FIG. 2 illustrates a schematic diagram of an embodiment of the controller CON of the power conversion circuit 1. As shown in FIG. 2, the controller CON includes a control loop CL, a sampling circuit SAM and a current reconstruction circuit CR.

The control loop CL receives the output voltage VOUT (or the feedback voltage related to the output voltage VOUT) generated by the smart power stage SPS and generates a pulse width modulation signal PWM according to the output voltage VOUT and a reference voltage VREF to control the operation of the smart power stage SPS.

In actual implementation, the control loop CL can include an error amplifier AMP, an analog-to-digital converter ADC, a comparator CMP, a digital ramp signal generator UPC and an on-time generator TON. The analog-to-digital converter ADC is coupled between the error amplifier AMP and a negative input terminal– of the comparator CMP. The digital ramp signal generator UPC is coupled between a positive input terminal+ and an output terminal of the comparator CMP. The output terminal of the comparator CMP is coupled to the on-time generator TON.

The error amplifier AMP receives the output voltage VOUT and the reference voltage VREF to generate an analog error signal COMP, which is converted into a digital error signal DCOMP by the analog-to-digital converter ADC and is fed to the negative input terminal– of the comparator CMP. The positive input terminal+ of the comparator CMP receives the digital ramp signal DRAMP. The digital ramp signal generator UPC is used to count up to generate a digital ramp signal DRAMP. The output terminal of the comparator CMP outputs a digital trigger signal DTR to the on-time generator TON to generate the pulse width modulation signal PWM, and it also resets the digital ramp signal DRAMP.

The sampling circuit SAM is coupled to the smart power stage SPS and the control loop CL respectively to receive the current monitoring signal IMON and the pulse width modulation signal PWM respectively. It samples the current monitoring signal IMON at a rising edge of the pulse width modulation signal PWM to obtain a calibration reference value DIMON. In actual implementation, the sampling circuit SAM can include an analog-to-digital converter ADC, which is used to convert the analog current monitoring signal IMON into a digital calibration reference value DIMON at the rising edge of the pulse width modulation signal PWM and to hold it, but not limited to this.

The current reconstruction circuit CR is coupled to the control loop CL and the sampling circuit SAM. The current reconstruction circuit CR receives the input voltage VIN, the reference voltage VREF, the pulse width modulation signal PWM and the calibration reference value DIMON respectively. The current reconstruction circuit CR generates a reconstructed current IRE according to the input voltage VIN, the reference voltage VREF and the pulse width modulation signal PWM, and uses the calibration reference value DIMON to calibrate the reconstructed current IRE.

If the subsequent circuits are implemented in analog domain, for example OCP protection or load-line control circuit, the reconstructed current IRE can be converted into a voltage signal or a current signal through a digital-to-analog converter in the controller CON; If the subsequent circuits are implemented in digital domain, since the calculated reconstructed current IRE is a digital value, it can be directly provided to the digital circuit as an operand. It should be noted that if the power conversion circuit 1 is a multi-phase buck converter circuit, a single sampling circuit SAM (for example, it can be an analog-to-digital converter ADC) can be used to sequentially read the current monitoring signals of each phase to reduce its overall current consumption and circuit area, but not limited to this.

Figure 3:
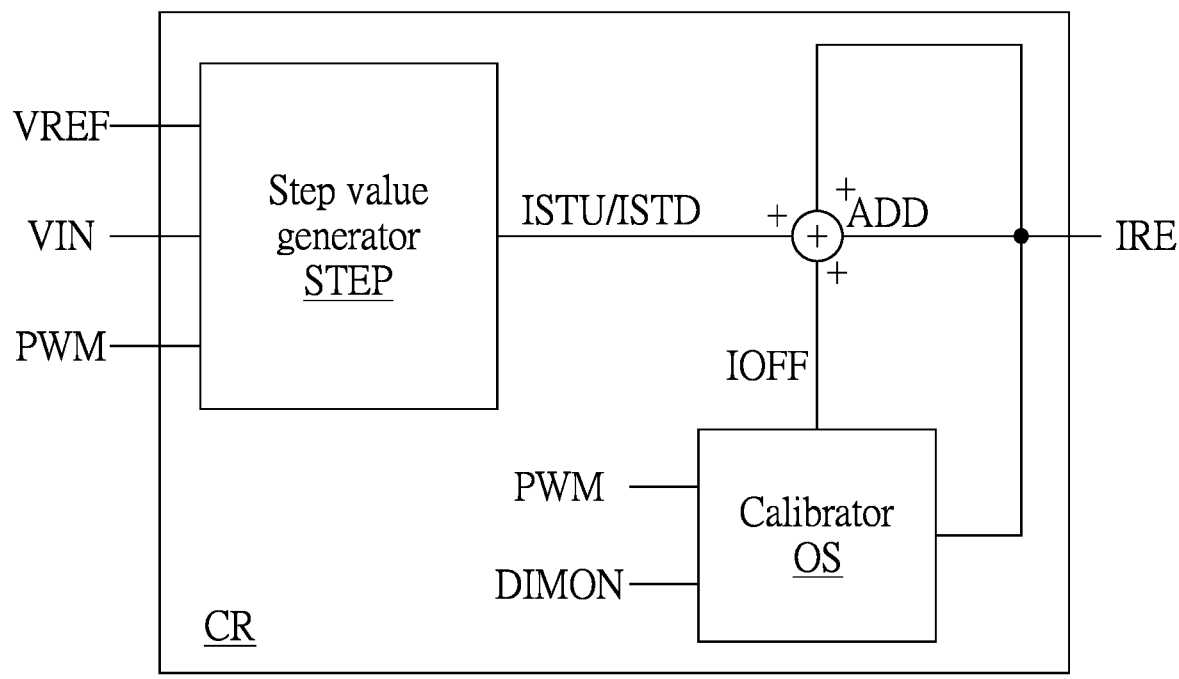
FIG. 3 illustrates a schematic diagram of an embodiment of a current reconstruction circuit of the invention.

Please refer to FIG. 3. FIG. 3 illustrates a schematic diagram of an embodiment of the current reconstruction circuit CR. As shown in FIG. 3, the current reconstruction circuit CR includes a step value generator STEP, a calibrator OS and a calculator ADD. The step value generator STEP is coupled to the control loop CL for generating a step-up value ISTU or a step-down value ISTD according to the pulse width modulation signal PWM. The calibrator OS is coupled to the control loop CL and is used for generating a calibration value IOFF according to the calibration reference value DIMON and the value of the reconstructed current IRE; the calibration value IOFF is calculated at the rising edge of the pulse width modulation signal PWM for calibrating the reconstructed current IRE. The calculator ADD is coupled to the step value generator STEP and the calibrator OS for generating the reconstructed current IRE according to the step-up value ISTU/the step-down value ISTD and the calibration value IOFF. The calculator ADD can be, for example, an adder.

When the pulse width modulation signal PWM is in the first state (such as high-level), the step value generator STEP generates the step-up value ISTU according to the calibration reference value DIMON, the input voltage VIN, the reference voltage VREF, the setting value SET related to the output inductance L and the system clock TCLK. Assuming that the reconstructed current of the current clock is IRE, the reconstructed current IRE' of the next clock is:

$$IRE'=IRE+ISTU \quad (1)$$

$$ISTU=[(VIN-VREF)/SET]\times TCLK \quad (2)$$

When the pulse width modulation signal PWM is in the second state (such as low-level), the step value generator STEP generates the step-down value ISTD according to the calibration reference value DIMON, the reference voltage VREF, the setting value related to the output inductor L and the system clock TCLK. Assuming that the reconstructed current of the current clock is IRE, the reconstructed current IRE' of the next clock is:

$$IRE'=IRE-ISTD \quad (3)$$

$$ISTD=(VREF/SET)\times TCLK \quad (4)$$

The current reconstruction circuit CR generates a rising waveform of the reconstructed current IRE according to the input voltage VIN, the setting value SET related to the output inductor L and the reference voltage VREF. The current reconstruction circuit CR generates a falling waveform of the reconstructed current IRE according to the reference voltage VREF and the setting value related to the output inductance L.

It should be noted that the setting value SET is related to the inductance value of the output inductor L. It can be pre-stored in the current reconstruction circuit CR through user setting, system automatic detection, or look-up table setting.

Figure 4:
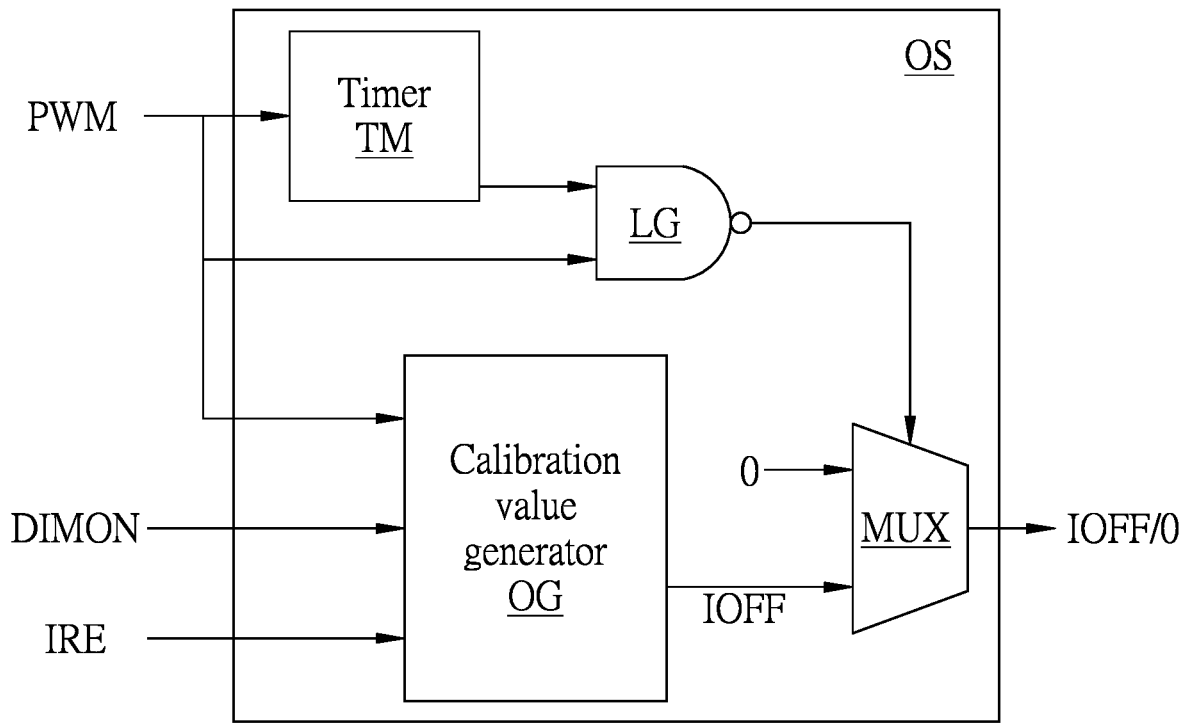
FIG. 4 illustrates a schematic diagram of an embodiment of a calibrator of the invention.

Please refer to FIG. 4. FIG. 4 illustrates a schematic diagram of an embodiment of the calibrator OS. As shown in FIG. 4, the calibrator OS includes a timer TM, a determination logic LG, a calibration value generator OG and a multiplexer MUX. The timer TM is coupled to the determination logic LG. Both the determination logic LG and the calibration value generator OG are coupled to the multiplexer MUX. The timer TM, the determination logic LG and the calibration value generator OG all receive the pulse width modulation signal PWM. The calibration value generator OG generates the calibration value IOFF according to the pulse width modulation signal PWM, the calibration reference value DIMON and the reconstructed current IRE.

It should be noted that because the current monitoring signal IMON reported by the smart power stage SPS in a transient state may be inaccurate, direct usage may result in an abnormal function of the controller CON. Therefore, a timer TM and a determination logic LG are disposed in the calibrator OS and are used to stop the calibration function in the transient state to prevent the wrong calibration value from affecting the reconstructed current, and the calibration function is resumed after the transient state is over.

For example, when a cycle of the pulse width modulation signal PWM obtained by the timer TM is less than the default time, it means that it is in the transient state, and the calibrator OS stops generating the calibration value IOFF to calibrate the reconstructed current IRE. Its working principle is: when a falling edge of the pulse width modulation signal PWM occurs, it triggers the timer TM to start timing the time length (TOFF) of the pulse width modulation signal PWM in the second state (low-level) until the rising edge of the pulse width modulation signal PWM occurs; it is then determined whether the time length (TOFF) of the pulse width modulation signal PWM in the second state (low-level) exceeds the default time T (usually 200 ns-400 ns).

If the determination result is yes, it means that the current monitoring signal IMON reported by the smart power stage SPS is reliable, and the subsequent calibration procedures can be continued. The value of the reconstructed current IRE at the rising edge of the pulse width modulation signal PWM is stored in the register, and the analog current monitoring signal IMON is converted into the digital calibration reference value DIMON by the sampling circuit SAM. The calibration value generator OG calculates the difference between the calibration reference value DIMON and the reconstructed current IRE and outputs the calibration value IOFF of this period through the multiplexer MUX to calibrate the reconstructed current IRE, so that the gap between the reconstructed current IRE and the real inductor current IL can be kept small.

If the determination result is no, it means that the current monitoring signal IMON reported by the smart power stage SPS is unreliable, and the calibrator OS waits for the next reliable data without performing calibration. During this time, the reconstructed current IRE continues to perform the aforementioned accumulation/subtraction actions.

Figure 5:
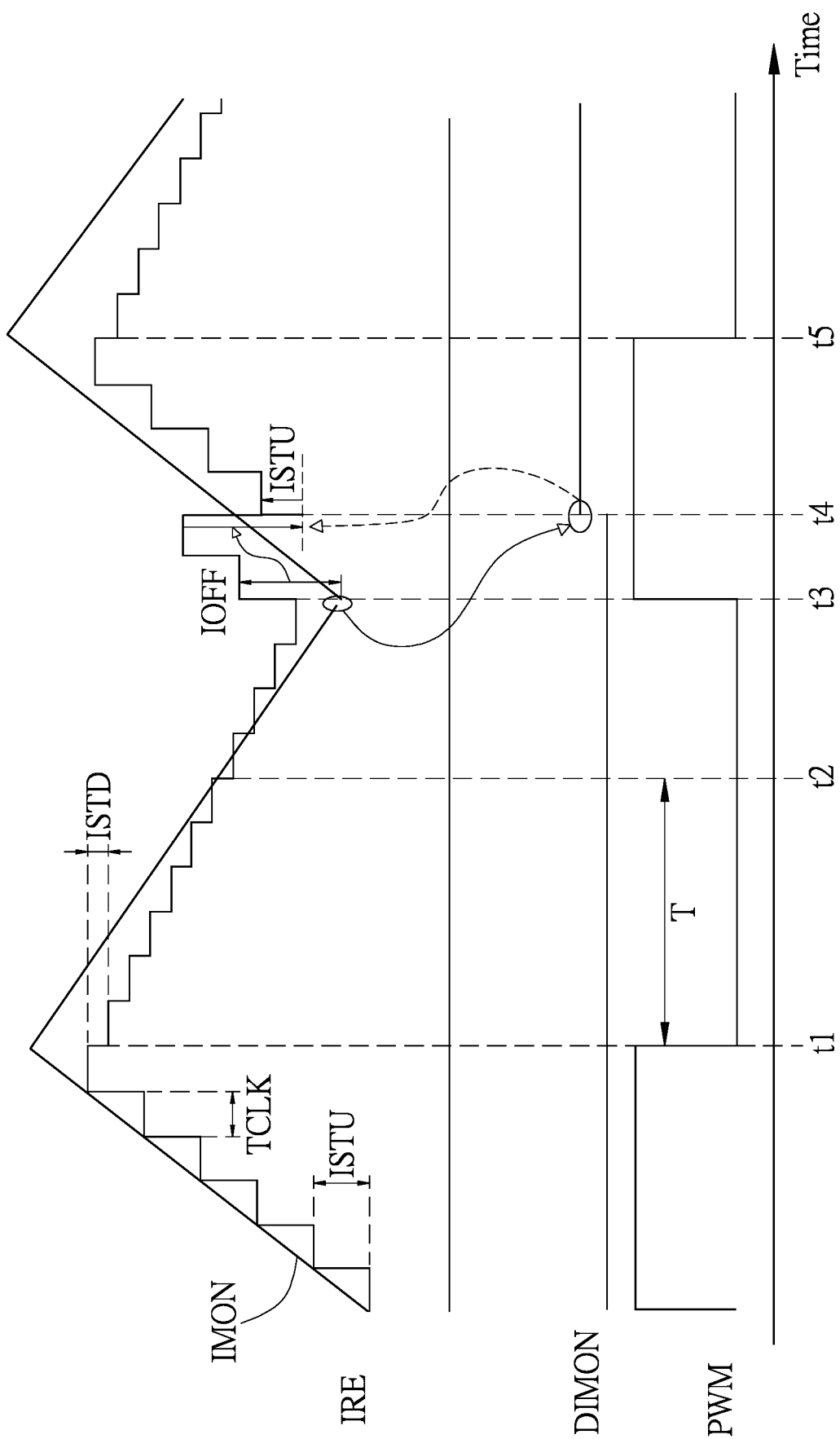
FIG. 5 illustrates a timing diagram of a waveform of a reconstructed current generated by a current reconstruction circuit of the invention.

Please refer to FIG. 5. FIG. 5 illustrates a timing diagram of a waveform of the reconstructed current IRE generated by the current reconstruction circuit CR. As shown in FIG. 5, before the time t1, the pulse width modulation signal PWM is in the first state (high-level), and the step value generator STEP generates the step-up value ISTU according to the input voltage VIN, the reference voltage VREF, and the setting value SET and the system clock TCLK as shown in the above formula (2).

At the time t1, the falling edge of the pulse width modulation signal PWM occurs, that is to say, the pulse width modulation signal PWM goes into the second state (low-level), and the step value generator STEP starts to generate the step-down value ISTD according to the reference voltage VREF, the setting value SET and the system clock TCLK as shown in the above formula (4). It should be noted that the timer in the sampling circuit SAM starts timing from the falling edge of the pulse width modulation signal PWM.

At the time t2, when the timer in the sampling circuit SAM has counted for a default time T (for example, 400 ns), the controller CON starts the sampling circuit SAM to sample the current monitoring signal IMON. Therefore, the sampling circuit SAM does not need to be activated continuously, and its power consumption can be reduced.

At the time t3, the rising edge of the pulse width modulation signal PWM occurs and the pulse width modulation signal PWM changes to the first state (high-level). The step value generator STEP starts to generate the step-up value ISTU according to the input voltage VIN, the reference voltage VREF, and the setting value SET and the system clock TCLK as shown in the formula (5). The rising edge of the pulse width modulation signal PWM causes the sampling circuit SAM to hold the current analog value of the current monitoring signal IMON and start the analog-to-digital conversion.

At the time t4, the sampling circuit SAM sends out the calibration reference value DIMON, and the calibration value generator OG calculates the calibration value IOFF according to the saved reconstructed current IRE and the calibration reference value DIMON. The calibration value IOFF is generated according to the following formula:

$$IOFF = DIMON - IRE \tag{5}$$

The adder ADD adds up the calibration value IOFF, the step-up value ISTU and the current reconstructed current IRE to generate a new reconstructed current IRE', and completes the calibration of the reconstructed current IRE, and it is expressed as a formula:

$$IRE' = IST + IOFF + IRE \tag{6}$$

wherein IST is the step value at the time t4 (the step-up value ISTU in this example), IOFF is the calibration value, IRE is the reconstructed current value at the time t4 (a first system clock), and IRE' is the reconstructed current value immediate after the time t4 (a second system clock), and the second system clock is immediately after the first system clock.

At the time t5, the falling edge of the pulse width modulation signal PWM occurs, that is to say, the pulse width modulation signal PWM changes to the second state (low-level), and the step value generator STEP starts to generate a step-down value ISTD according to the formula (6) and repeat the process from the time t1. This is repeated so that the current monitoring signal IMON provided by the smart power stage SPS is reconstructed in the controller CON through digital operations as the reconstructed current IRE.

Figure 6:
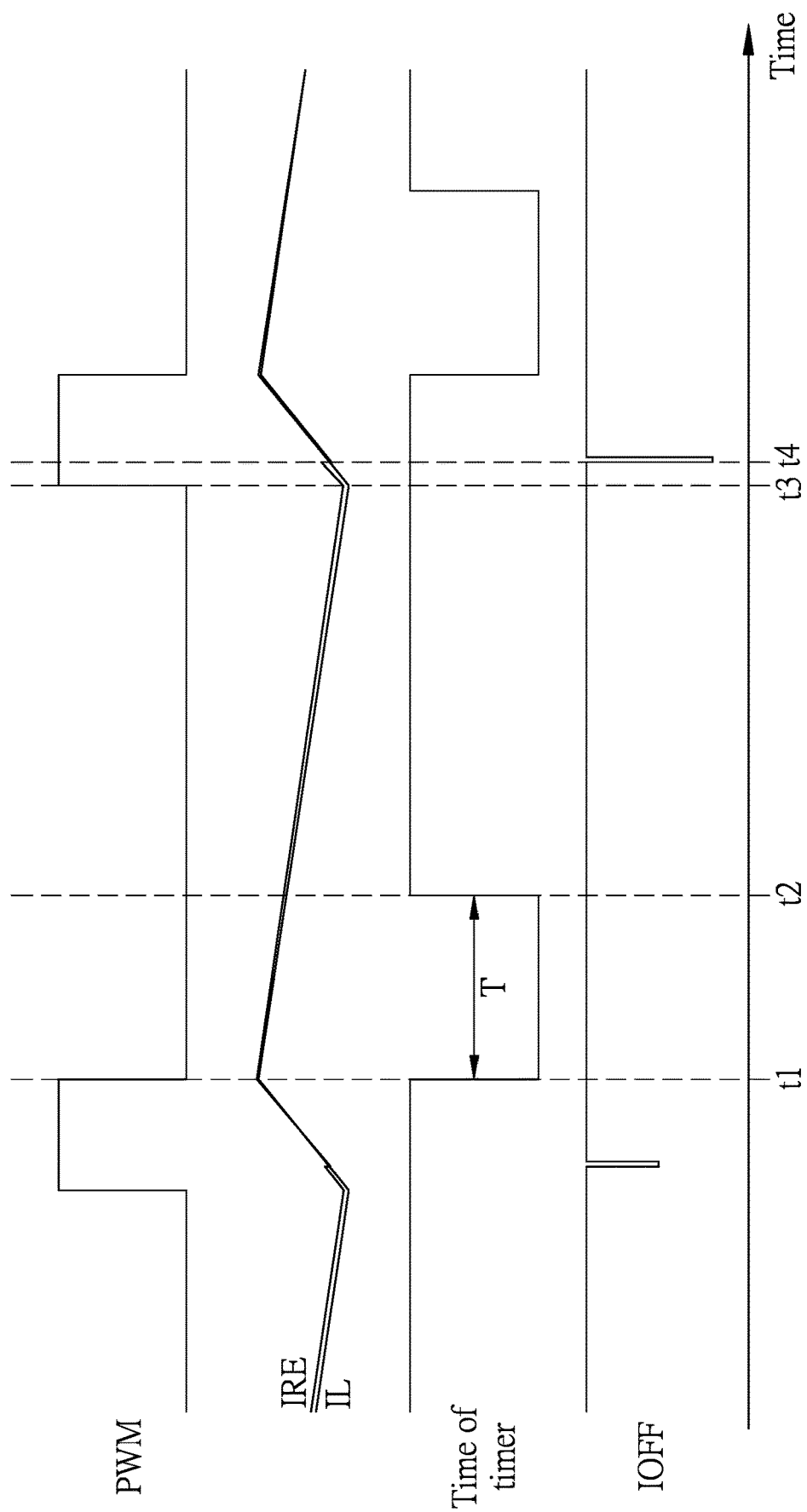
FIG. 6 illustrates a waveform timing diagram of a controller of a power conversion circuit of the invention under normal operation.

Please refer to FIG. 6. FIG. 6 illustrates a waveform timing diagram of the controller CON of the power conversion circuit 1 under normal operation. As shown in FIG. 6, at the time t1, the falling edge of the pulse width modulation signal PWM occurs, and the timer TM starts timing. During the period from time t1 to time t2, there is no rising edge of the pulse width modulation signal PWM, which means that the current monitoring signal IMON provided by the smart power stage SPS in this period should be reliable, and the calibrator OS can perform the calibration on the reconstructed current IRE.

At the time t3, the rising edge of the pulse width modulation signal PWM occurs, and the calibration value generator OG records the value of the reconstructed current IRE at this time, and the sampling circuit SAM in FIG. 2 starts to convert the current monitoring signal IMON at this time into a calibration reference value DIMON. At the time t4, the sampling circuit SAM supplies the converted calibration reference value DIMON to the calibration value generator OG. The calibration value generator OG calculates the difference between the calibration reference value DIMON and the reconstructed current IRE and outputs the calibration value IOFF of this cycle through the multiplexer MUX to calibrate the reconstructed current IRE.

Figure 7:
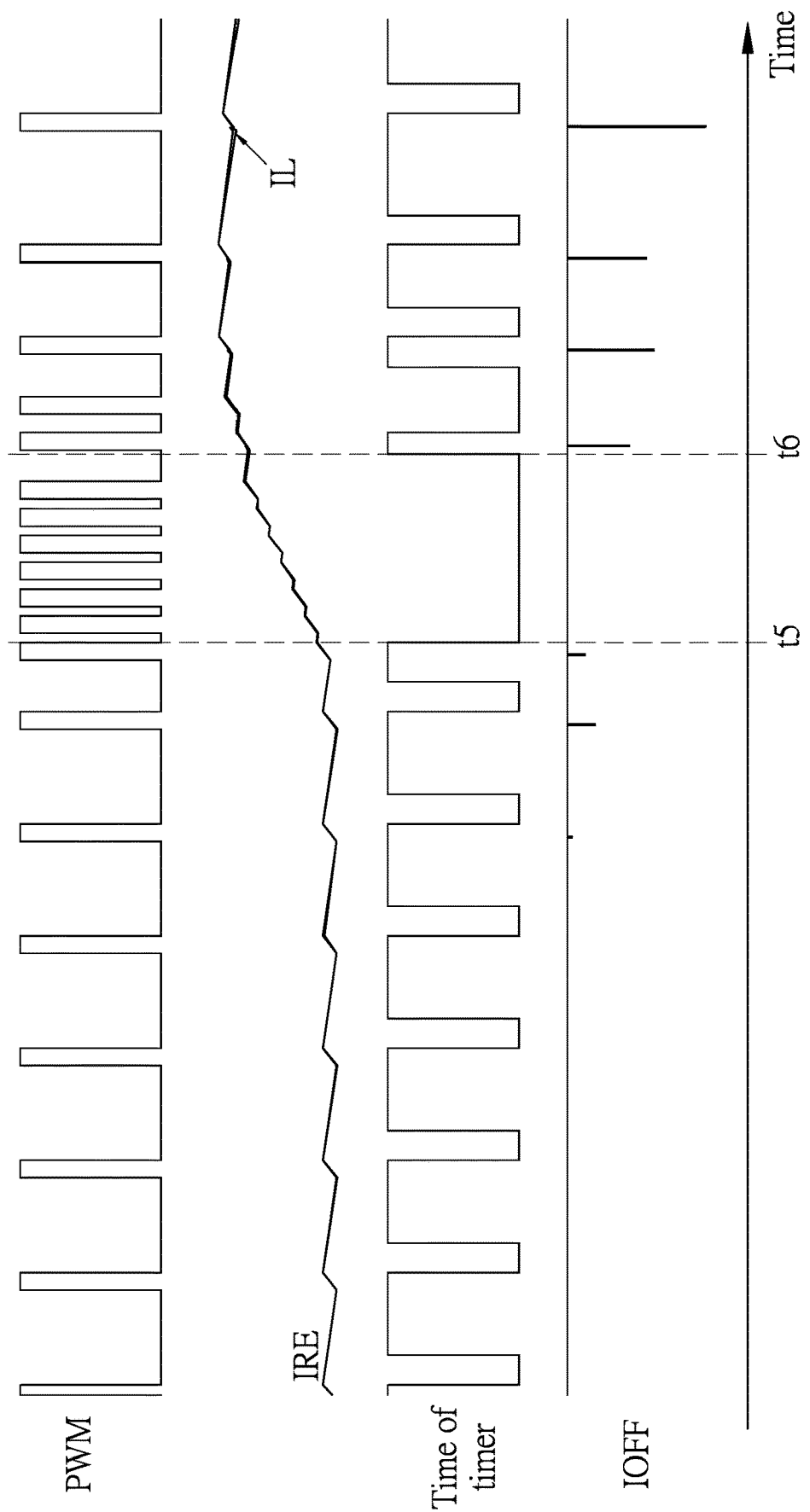
FIG. 7 illustrates a waveform timing diagram of a controller of a power conversion circuit of the invention not performing calibration in a transient state.

Please refer to FIG. 7. FIG. 7 illustrates a waveform timing diagram of the controller CON of the power conversion circuit 1 not performing calibration in a transient state.

As shown in FIG. 7, when the transient state occurs, the load increases at the time t5, and the loop control shortens the time of the pulse width modulation signal PWM being at low level to increase the current output. During the period from time t5 to time t6, the timer TM is repeatedly reset by the rising edge of the pulse width modulation signal PWM (that is, the time period when the pulse width modulation signal PWM is at low level is shorter than the default time T), so that the output of the determination logic LG is at low level during this period, and the multiplexer MUX outputs 0 (the output of the calibration value generator OG continues to be 0). The calibration procedure of the reconstructed current IRE is stopped, but the current reconstruction circuit CR continues to perform the accumulation/subtraction action to generate the rising/falling waveform of the reconstruct current IRE. After time t6, the time period that the pulse width modulation signal PWM is at low level is longer than the default time T again, and the calibration value IOFF is regenerated to start the calibration procedure of the reconstructed current IRE.

It should be noted that although the calibration procedure of the reconstructed current IRE was not performed during the period from time t5 to time t6, the waveform of the reconstructed current IRE is still close enough to the real inductor current IL, and the reconstructed current IRE can be used as the input source for functions such as overcurrent protection.

Figure 8:
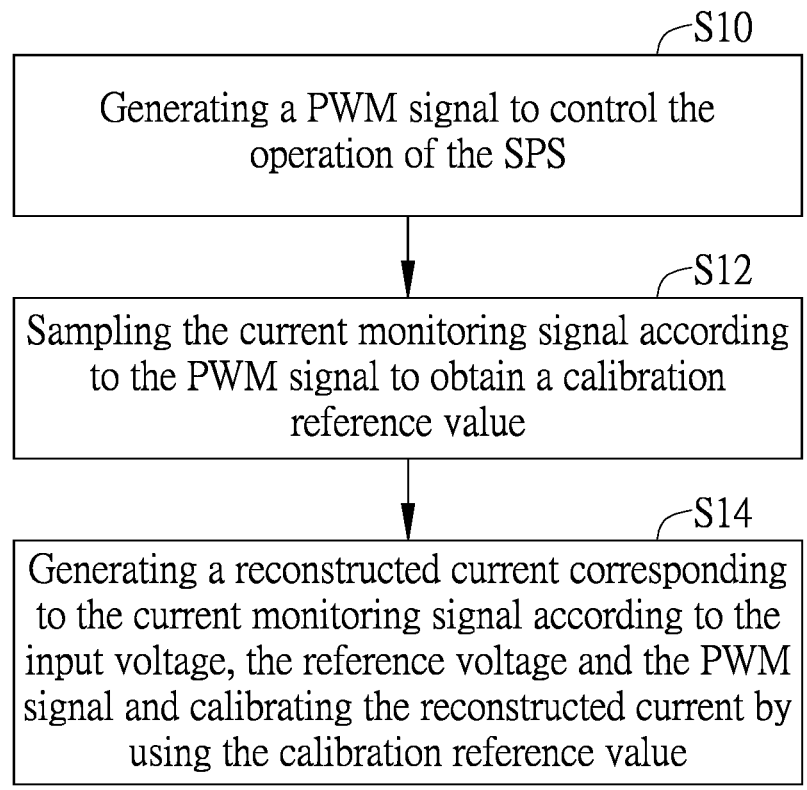
FIG. 8 illustrates a flowchart of a method of operating a controller of a power conversion circuit according to another embodiment of the invention.

Another specific embodiment according to the invention is a method of operating a controller of a power conversion circuit. In this embodiment, the smart power stage (SPS) provides a current monitoring signal to the controller. Please refer to FIG. 8. FIG. 8 illustrates a flowchart of the controller operating method in this embodiment.

As shown in FIG. 8, the controller operating method includes the following steps:

Step S10: generating a pulse width modulation (PWM) signal to control the operation of the SPS;

Step S12: sampling the current monitoring signal according to the PWM signal to obtain a calibration reference value; and Step S14: generating a reconstructed current corresponding to the current monitoring signal according to the input voltage, the reference voltage and the PWM signal and calibrating the reconstructed current by using the calibration reference value.

In practical applications, when the PWM signal is in the first state (such as high level), the method generates a step-up value according to the input voltage VIN, the reference voltage VREF, the setting value SET and the system cycle TCLK as shown in the above formula (5); when the PWM signal is in the second state (such as low level), the method generates a step-down value according to the reference voltage VREF, the setting value SET and the system cycle TCLK as shown in the above formula (6). When the cycle of the PWM signal is shorter than the setting time, the calibration of the reconstructed current is stopped.

In one embodiment, Step S14 includes: generating a step value according to the input voltage, the reference voltage and the PWM signal; at the rising edge of the PWM signal, generating a calibration value according to the calibration reference value and the reconstruction current; and generating the reconstructed current according to the step value and the calibration value.

In another embodiment, the rising waveform of the reconstructed current is generated according to the input voltage VREF, the setting value SET and the reference voltage VREF as shown in the above formula (1) and formula (2); the falling waveform of the reconstructed current is generated according to the reference voltage VREF and the setting value SET as shown in the above formula (3) and formula (4).

Compared to the prior art, the controller of the power conversion circuit and its operating method of the invention can achieve the following effects and advantages:

(1) High compatibility: no matter what method the SPS uses to generate the current monitoring signal (IMON), the controller of the power conversion circuit of the invention is only triggered by the rising edge of the PWM signal to sample the valley value of the current monitoring signal (IMON). The information is used to calibrate the reconstructed current, and the rest of the current waveform is reconstructed inside the controller, so that the peak current clamping function can work normally; and (2) No signal delay problem: a digital reconstructed current corresponding to the current monitoring signal is generated inside the controller in the invention, and the digital value is provided to the digital circuit inside the controller for direct calculation, so there will be no signal delay issue caused by the analog circuit.

With the example and explanations above, the characteristics and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A controller of a power conversion circuit, coupled to a smart power stage (SPS), configured to control the SPS to convert an input voltage into an output voltage and provide an output current, the SPS providing a current monitoring signal to the controller, the controller comprising:
   a control loop, coupled to the SPS, configured to generate a pulse width modulation (PWM) signal according to the output voltage and a reference voltage to control an operation of the SPS;
   a sampling circuit, coupled to the SPS, configured to receive the current monitoring signal and sample the current monitoring signal according to the PWM signal to obtain a calibration reference value; and
   a current reconstruction circuit, coupled to the control loop and the sampling circuit, wherein the current reconstruction circuit configured to generate a reconstructed current corresponding to the current monitoring signal according to the input voltage, the reference voltage and the PWM signal and calibrate the reconstructed current by using the calibration reference value.

2. The controller of claim 1, wherein the power conversion circuit has an output inductance; when the PWM signal is in a first state, the current reconstruction circuit generates a step-up value according to the following formula:

$$ISTU=[(VIN-VREF)/SET] \times TCLK,$$

wherein VIN is the input voltage, VREF is the reference voltage, SET is a setting value related to the output inductance, TCLK is a system clock and ISTU is the step-up value.

3. The controller of claim 1, wherein the power conversion circuit has an output inductance; when the PWM signal is in a second state, the current reconstruction circuit generates a step-down value according to the following formula:

$$ISTD=(VREF/SET) \times TCLK,$$

wherein VREF is the reference voltage, SET is a setting value related to the output inductance, TCLK is a system clock and ISTD is the step-down value.

4. The controller of claim 1, wherein the current reconstruction circuit comprises:
   a step value generator, coupled to the control loop, configured to generate a step value according to the input voltage, the reference voltage and the PWM signal;
   a calibrator, coupled to the control loop, configured to generate a calibration value according to the calibration reference value and the reconstructed current at a rising edge of the PWM signal when the pulse width modulation signal is rising; and
   a calculator, coupled to the step value generator and the calibrator respectively, configured to generate the reconstructed current according to the step value and the calibration value.

5. The controller of claim 4, wherein the calibration value is generated according to the following formula:

$$IOFF=DIMON-IRE,$$

wherein DIMON is the calibration reference value, IOFF is the calibration value, and IRE is the reconstructed current.

6. The controller of claim 4, wherein the reconstructed current is calibrated according to the following formula:

$$IRE'=IST+IOFF+IRE,$$

wherein IST is the step value, IOFF is the calibration value, IRE is the reconstructed current value of a first system clock, IRE' is the reconstructed current value of a second system clock, and the second system clock is immediately after the first system clock.

7. The controller of claim 1, wherein the sampling circuit also comprises a timer, when a cycle of the PWM signal obtained by the timer is less than a default time, the controller stops generating the calibration value.

8. A method of operating a controller of a power conversion circuit used to control a smart power stage (SPS) to convert an input voltage into an output voltage and provide an output current, the SPS providing a current monitoring signal related to the output current to the controller, the method comprising following steps of:
   (a) generating a PWM signal according to the output voltage and a reference voltage to control the operation of the SPS;
   (b) sampling the current monitoring signal according to the PWM signal to obtain a calibration reference value; and
   (c) generating a reconstructed current corresponding to the current monitoring signal according to the input voltage, the reference voltage and the PWM signal and calibrating the reconstructed current by using the calibration reference value.

9. The method of claim 8, wherein the power conversion circuit has an output inductance; the step (c) further comprises:
   when the PWM signal is in a first state, generating a step-up value according to the following formula:

$$ISTU=[(VIN-VREF)/SET] \times TCLK,$$

wherein VIN is the input voltage, VREF is the reference voltage, SET is a setting value related to the output inductance, TCLK is a system clock and ISTU is the step-up value.

10. The method of claim 8, wherein the power conversion circuit has an output inductance; the step (c) further comprises:
    when the PWM signal is in a second state, generating a step-down value according to the following formula:

$$ISTD=(VREF/SET) \times TCLK,$$

wherein VREF is the reference voltage, SET is a setting value related to the output inductance, TCLK is a system clock and ISTD is the step-down value.

11. The method of claim 8, wherein the step (c) further comprises:
    generating a step value according to the input voltage, the reference voltage and the PWM signal;
    generating a calibration value according to the calibration reference value and the reconstructed current at a rising edge of the PWM signal when the pulse width modulation signal is rising; and
    generating a reconstructed current according to the step value and the calibration value.

12. The method of claim 11, wherein the calibration value is generated according to the following formula:

$$IOFF=DIMON-IRE,$$

wherein DIMON is the calibration reference value, IOFF is the calibration value, and IRE is the reconstructed current.

13. The method of claim 11, wherein the reconstructed current is generated according to the following formula:

$$IRE'=IST+IOFF+IRE,$$

wherein IST is the step value, IOFF is the calibration value, IRE is the reconstructed current value of a first system clock, IRE' is the reconstructed current value of a second system clock, and the second system clock is immediately after the first system clock.

14. The method of claim 11, wherein the method further comprises:
    when a cycle of the PWM signal is less than a default time, stopping generating the calibration value.

* * * * *